(12) United States Patent
Lee

(10) Patent No.: US 10,852,579 B2
(45) Date of Patent: Dec. 1, 2020

(54) POLYESTER PROTECTION FILM FOR POLARISING PLATE, POLARISING PLATE COMPRISING SAME, AND LIQUID CRYSTAL DISPLAY APPARATUS COMPRISING SAME

(71) Applicant: Samsung SDI Co., Ltd., Yongin-si, Gyeonggi-do (KR)

(72) Inventor: Bae Wook Lee, Suwon-si (KR)

(73) Assignee: Samsung SDI Co., Ltd., Yongin (KR)

( * ) Notice: Subject to any disclaimer, the term of this patent is extended or adjusted under 35 U.S.C. 154(b) by 0 days.

(21) Appl. No.: 16/473,440

(22) PCT Filed: Oct. 31, 2017

(86) PCT No.: PCT/KR2017/012147
§ 371 (c)(1),
(2) Date: Jun. 25, 2019

(87) PCT Pub. No.: WO2018/124446
PCT Pub. Date: Jul. 5, 2018

(65) Prior Publication Data
US 2020/0150485 A1 May 14, 2020

(30) Foreign Application Priority Data
Dec. 27, 2016 (KR) .................. 10-2016-0180508

(51) Int. Cl.
| G02F 1/1335 | (2006.01) |
| G02B 1/04 | (2006.01) |
| G02B 1/14 | (2015.01) |
| G02B 5/22 | (2006.01) |

(52) U.S. Cl.
CPC ......... *G02F 1/133528* (2013.01); *G02B 1/04* (2013.01); *G02B 1/14* (2015.01); *G02B 5/22* (2013.01); *G02F 2201/086* (2013.01); *G02F 2201/50* (2013.01); *Y10T 428/105* (2015.01)

(58) Field of Classification Search
CPC ......... G02F 1/133528; G02F 2201/086; G02F 2201/50; Y10T 428/105; G02B 5/22
See application file for complete search history.

(56) References Cited

U.S. PATENT DOCUMENTS

| 2001/0014710 A1* | 8/2001 | Wylin .................. C08K 5/0075 524/320 |
| 2007/0252293 A1* | 11/2007 | Sato ........................ B29C 39/20 264/1.31 |
| 2009/0081388 A1* | 3/2009 | Takeda ................. C08K 5/0016 428/1.1 |

(Continued)

FOREIGN PATENT DOCUMENTS

| JP | 2009-216937 A | 9/2009 |
| JP | 2014-44387 A | 3/2014 |

(Continued)

*Primary Examiner* — Sophie Hon
(74) *Attorney, Agent, or Firm* — Lewis Roca Rothgerber Christie LLP

(57) ABSTRACT

A polyester protection film for a polarising plate that has a yellow index (YI) of 1.0 or less, and that includes an ultraviolet absorber of Chemical Formula 1 and an ultraviolet absorber of Chemical Formula 2; a polarising plate comprising the same; and a liquid crystal display apparatus comprising the same are provided.

9 Claims, 1 Drawing Sheet

(56) References Cited

U.S. PATENT DOCUMENTS

2013/0100378 A1* 4/2013 Murata ................... G02B 1/14
349/61

FOREIGN PATENT DOCUMENTS

| KR | 10-2009-0019808 A | 2/2009 |
| KR | 10-2009-0080332 A | 7/2009 |
| KR | 10-2009-0098879 A | 9/2009 |
| KR | 10-2015-0093110 A | 8/2015 |
| KR | 10-2016-0082639 A | 7/2016 |

* cited by examiner

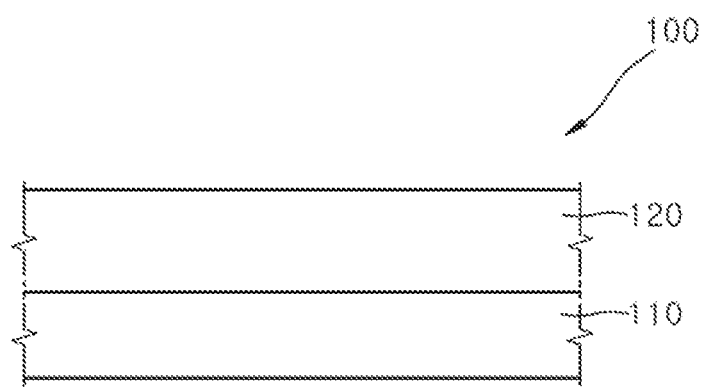

POLYESTER PROTECTION FILM FOR POLARISING PLATE, POLARISING PLATE COMPRISING SAME, AND LIQUID CRYSTAL DISPLAY APPARATUS COMPRISING SAME

CROSS-REFERENCE TO RELATED APPLICATIONS

This application is a National Phase Patent Application and claims priority to and the benefit of International Application Number PCT/KR2017/012147, filed on Oct. 31, 2017, which claims priority to and the benefit of Korean Patent Application No. 10-2016-0180508, filed on Dec. 27, 2016, the entire contents of each of which are incorporated herein by reference.

FIELD

The present invention relates to a polyester protective film for polarizing plates, a polarizing plate including the same, and a liquid crystal display including the same. More particularly, the present invention relates to a polyester protective film for polarizing plates which has low yellow index, exhibits low yellowing upon irradiation with light at high temperature or under high temperature/humidity conditions to provide good light resistance and has low light transmittance in the UV range, a polarizing plate including the same, and a liquid crystal display including the same.

BACKGROUND

A liquid crystal display essentially includes a polarizing plate with a protective film attached to a polarizer. As the protective film, a triacetylcellulose film is typically used. However, a triacetylcellulose film cannot secure sufficient mechanical strength when reduced in thickness and has high water permeability, thereby causing degradation of the polarizer. In addition, since the triacetylcellulose film is expensive, low-cost alternative materials are required.

A polarizer protective film placed on the outermost side of a liquid crystal display with respect to the viewer side typically includes various UV absorbers in large amounts in order to block UV light. However, such a polarizer protective film is likely to have poor color or to be yellowed at high temperature or under high temperature/humidity conditions due to antagonism between the UV absorbers and various additives in the protective film.

The background technique of the present invention is disclosed in Japanese Unexamined Patent Publication No. 2014-044387.

SUMMARY

It is one object of the present invention to provide a polyester protective film for polarizing plates, which has a low yellow index and exhibits low yellowing upon irradiation with light at high temperature or under high temperature/humidity conditions to provide good light resistance.

It is another object of the present invention to provide a polyester protective film for polarizing plates, which has low transmittance in the UV range.

It is a further object of the present invention to provide a polyester protective film for polarizing plates, which does not suffer from migration of a UV absorber.

In accordance with one aspect of the present invention, a polyester protective film for polarizing plates has a yellow index of 1.0 or less and includes a UV absorber represented by Formula 1 and a UV absorber represented by Formula 2:

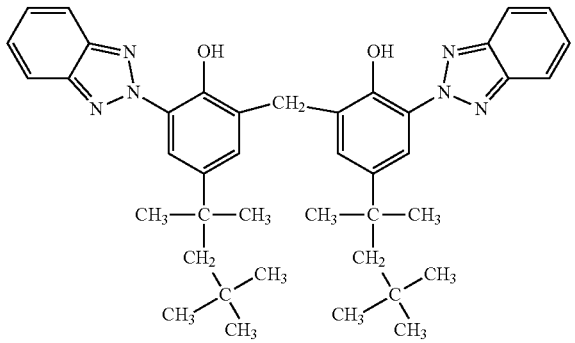

<Formula 1>

<Formula 2>

In accordance with another aspect of the present invention, a polarizing plate includes: a polarizer; and a polyester protective film formed on at least one surface of the polarizer, wherein the polyester protective film includes the polyester protective film for polarizing plates according to the present invention.

In accordance with a further aspect of the present invention, a liquid crystal display includes the polarizing plate according to the present invention.

The present invention provides a polyester protective film for polarizing plates, which has a low yellow index and exhibits low yellowing upon irradiation with light at high temperature or under high temperature/humidity conditions to provide good light resistance.

The present invention provides a polyester protective film for polarizing plates, which has low transmittance in the UV range.

The present invention provides a polyester protective film for polarizing plates, which does not suffer from migration of a UV absorber.

BRIEF DESCRIPTION OF THE DRAWINGS

FIG. 1 is a sectional view of a polarizing plate according to one embodiment of the present invention.

DETAILED DESCRIPTION

Embodiments of the present invention will be described in detail with reference to the accompanying drawings to provide thorough understanding of the invention to those skilled in the art. It should be understood that the present invention may be embodied in different ways and is not limited to the following embodiments. In the drawings, portions irrelevant to the description will be omitted for clarity. Like components will be denoted by like reference numerals throughout the specification.

Herein, spatially relative terms such as "upper" and "lower" are defined with reference to the accompanying drawings. Thus, it will be understood that the term "upper surface" can be used interchangeably with the term "lower surface", and when an element such as a layer or a film is referred to as being placed "on" another element, it can be directly placed on the other element, or intervening element(s) may be present. On the other hand, when an element is referred to as being placed "directly on" another element, there are no intervening element(s) therebetween.

Herein, "in-plane retardation (Re)" is represented by Equation 1, "degree of biaxiality (NZ)" is represented by Equation 2, and "out-of-plane retardation (Rth)" is represented by Equation 3.

$$Re=(nx-ny) \times d \qquad \text{<Equation 1>}$$

(wherein nx and ny are indices of refraction in the slow axis and fast axis directions of a polyester protective film at a wavelength of 550 nm, respectively, and d is a thickness of the polyester protective film (unit: nm)).

$$NZ=(nx-nz)/(nx-ny) \qquad \text{<Equation 2>}$$

(where nx, ny and nz are indices of refraction in the slow axis, fast axis, and thickness directions of a polyester protective film at a wavelength of about 550 nm, respectively).

$$Rth=((nx+ny)/2-nz) \times d \qquad \text{<Equation 3>}$$

(where nx, ny and nz are indices of refraction in the slow axis, fast axis, and thickness directions of a polyester protective film at a wavelength of about 550 nm respectively, and d is a thickness of the polyester protective film (unit: nm)).

Herein, "(meth)acryl" refers to acryl and/or methacryl.

Herein, "yellow index" is a value measured in accordance with ASTM D1925.

The present inventors found that a polyester protective film including UV absorbers represented by Formulae 1 and 2 had low transmittance in the UV absorption range and a low yellow index and exhibited low yellowing upon irradiation with light under certain conditions, and completed the present invention.

A polyester protective film for polarizing plates according to one embodiment of the present invention may include a benzotriazole UV absorber represented by Formula 1 and a benzotriazole UV absorber represented by Formula 2. The polyester protective film according to this embodiment can have a low light transmittance in the UV absorption region at a wavelength of 370 nm to 385 nm, for example, 370 nm, or 380 nm to 382 nm, a low yellow index and exhibit low yellowing upon irradiation with light to provide good reliability.

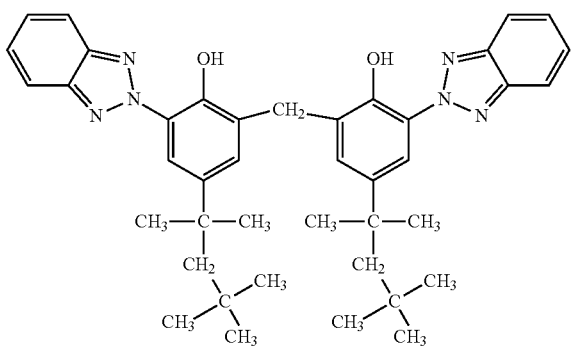

<Formula 1>

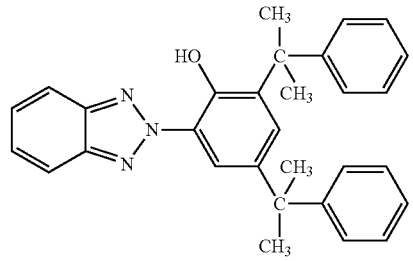

<Formula 2>

When the UV absorbers respectively represented by Formulae 1 and 2 are mixed with different types of absorbers or different benzotriazole UV absorbers, the yellow index of the polyester protective film can be relatively increased, or migration of the UV absorbers can occur due to poor compatibility with a polyester. According to this embodiment, there is no antagonism between the UV absorber represented by Formula 1 and the UV absorber represented by Formula 2. Thus, the polyester protective film has a considerably low yellow index and high resistance to migration due to good compatibility of the UV absorbers with a polyester, as compared with a polyester protective film using only one of the UV absorbers or using a mixture of the UV absorbers and different types of UV absorbers. The polyester protective film according to this embodiment has a yellow index of 1.0 or less, for example, 0 to 1.0. Within this range, the polyester protective film does not affect transmittance and optical efficiency of a polarizing plate and is closer to a bluish color than to a yellowish color in the color coordinate system, thereby improving contrast of a liquid crystal panel. In addition, the polyester protective film according to this embodiment may have a haze of 1% or less, for example, 0.5% or less, at a wavelength of 300 nm to 800 nm. Within this range, the polyester protective film can be used in a polarizing plate and does not affect optical efficiency of the polarizing plate.

The polyester protective film for polarizing plates according to this embodiment has good UV blocking properties and thus can be used as the outermost protective film of a viewer side polarizing plate of a liquid crystal display. The polyester protective film for polarizing plates may have a light transmittance of 1% or less, for example, 0% to 1% or 0% to 0.5%, at a wavelength of 370 nm and a light transmittance of 5% or less, for example, 0% to 5%, at a wavelength of 380 nm to 382 nm. Within this range, the polyester protective film has low UV transmittance and thus can prevent a liquid crystal layer of a liquid crystal panel from being damaged by UV light.

The UV absorber represented by Formula 1 may be reduced in weight by 2.0% by weight (wt %) when heated to 350° C. at a heating rate of 20° C./min in air. The UV absorber represented by Formula 1 may be reduced in weight by 2.0 wt % when heated to 280° C. at a heating rate of 20° C./min in air. Thus, the UV absorbers are not degraded during preparation of the polyester protective film, whereby desired UV absorption can be obtained even when the UV absorbers are used in small amounts. Each of the UV absorbers represented by Formulae 1 and 2 may be prepared by any typical method known to those skilled in the art, or may be a commercially available product.

The UV absorber represented by Formula 1 may be present in an amount of 0.5 wt % to 5.0 wt %, for example, 0.5 wt % to 3.0 wt % or 1.0 wt % to 3.0 wt %, in the polyester protective film, which is larger than the amount of the UV absorber represented by Formula 2, and the UV absorber represented by Formula 2 may be present in an amount of 0.1 wt % to 2.0 wt %, for example, 0.3 wt % to 1.0 wt % or 0.5 wt % to 1.0 wt % in the polyester protective film. When the amounts of the UV absorbers fall within these ranges, the polyester protective film can have low yellow index, cannot suffer from migration of the UV absorbers during preparation thereof, and can exhibit low yellowing upon irradiation with light at high temperature or under high temperature/humidity conditions, thereby providing good reliability. For example, the polyester protective film may have a change in yellow index ($\Delta$YI) of 1.0 or less, for example, 0.8 or less or 0.7 or less, as calculated according to Equation 4. Within this range, the polyester protective film can have good reliability.

Change in yellow index=$YI_2-YI_1$ <Equation 4>

(wherein $YI_1$ denotes an initial yellow index of the polyester protective film, and $YI_2$ denotes a yellow index measured after irradiation with light at a fluence of 0.68 W/m$^2$ at a wavelength of 340 nm at 63° C. and 40% RH for 500 hours).

For example, irradiation with light at a fluence of 0.68 W/m$^2$ at a wavelength of 340 nm may be performed using an Xe-Lamp (Model Q-SUN Xe-1, Q-LAB Corporation), which simulates sunlight.

$YI_2$ may range from 0.5 to 1.0, for example, 0.6 to 0.9. Within this range, the polyester protective film can have good reliability.

The polyester is an optically transparent polyester resin and may include, for example, at least one of polyethylene terephthalate, polyethylene naphthalate, polybutylene terephthalate, and polybutylene naphthalate, preferably, polyethylene terephthalate.

The polyester protective film may have an index of refraction of 1.3 to 1.7, specifically 1.4 to 1.6, 1.5 to 1.7, or 1.5 to 1.6. Within this range, the polyester protective film can be used for a base film of a polarizer protective film and can improve light transmittance of the polyester protective film in combination with the UV absorber represented by Formula 1 and the UV absorber represented by Formula 2.

The polyester protective film may be prepared through a process in which the polyester resin is mixed with the UV absorbers represented by Formulae 1 and 2, followed by melt extrusion. Preferably, the polyester protective film is a low-retardation protective film, for example, a biaxially stretched low-retardation film. If the polyester protective film is a high-retardation film, the polyester protective film has a light transmittance of higher than 5% at a wavelength of 380 nm to 382 nm and thus has poor UV-cut performance.

In one embodiment, the polyester protective film may have an in-plane-retardation of 350 nm or less, preferably 10 nm to 350 nm, as measured at a wavelength of 550 nm. The polyester protective film may have an out-of-plane-retardation of 2,500 nm to 12,000 nm, preferably 5,000 nm to 10,000 nm, as measured at a wavelength of 550 nm. The polyester protective film may have a degree of biaxiality of 8 or more, preferably 8 to 1,200, as measured at a wavelength of 550 nm. Within these ranges of retardation, rainbow mura caused by the low-retardation polarizer protective film can be suppressed.

In one embodiment, the polyester protective film may have a ratio of Re to Rth (Re/Rth) of 0.15 or less, as measured at a wavelength of 550 nm. Within this range, rainbow mura caused by the low-retardation polarizer protective film can be suppressed. Preferably, the polyester protective film has a ratio (Re/Rth) of 0.001 to 0.15, more preferably 0.01 to 0.10.

The polyester protective film may further include any suitable UV absorbers known to those skilled in the art, in addition to the UV absorbers represented by Formulae 1 and 2.

For example, the polyester protective film may further include oxanilide, triazine, benzophenone, and formamidine UV absorbers.

The polyester protective film may further include any typical additives known to those skilled in the art. Examples of the additives may include an antioxidant, a dispersant, an antifoaming agent, a lubricant, a radical scavenger, an acid scavenger, a leveling agent, a surface energy modifier, a preservative, and an oxidation stabilizer. The antioxidant may include phenol, phosphorus, and amine antioxidants. The oxidation stabilizer may include, for example, tris(2,4-ditert-butylphenyl)phosphate (Irgafos 168) and pentaerythritol tetrakis(3,5-di-tert-butyl-4-hydroxyhydrocinnamate), without being limited thereto. Particularly, a phosphorus antioxidant is preferred to achieve the effects of the present invention. The additives may be present in an amount of 5 wt % or less, for example, 0.1 wt % to 3 wt % or 0.5 wt % to 3 wt % in the polyester protective film. Within this range, the additives can provide desired effects without affecting the UV absorbers.

The polyester protective film may have a thickness of 5 μm to 60 μm, preferably 20 μm to 60 μm or 30 μm to 50 μm. Within this range, the polyester protective film can be used as a polarizer protective film.

The polyester protective film may be a stretched retardation film. The polyester protective film may be a film stretched to have an in-plane-retardation and a degree of biaxiality within the ranges described above. Preferably, the polyester protective film is a biaxially stretched film which has a low in-plane-retardation in the above range. For example, the polyester protective film may be a film subjected to simultaneous biaxial stretching in the MD and the TD or sequential biaxial stretching in the MD and the TD. The polyester protective film may be a film stretched to 2.5 times or more to 3.5 times or less an initial length thereof in the MD and 2.0 times or more to 4.5 times or less an initial length thereof in the TD. In this case, the polyester protective film can have an in-plane-retardation and a degree of biaxiality within the ranges described above. Here, stretching may include dry stretching and wet stretching, and may be performed at a predetermined temperature for a predetermined period of time, which are known to those skilled in the art, in order to obtain in-plane-retardation and out-of-plane-retardation values within the aforementioned ranges.

The polyester protective film may further include at least one of a primer layer and a functional layer on one or both surfaces thereof.

The primer layer is formed on the polyester protective film to improve adhesion of the polyester protective film to a polarizer. The primer layer is formed directly on the polyester protective film. Unlike a triacetylcellulose film, the polyester protective film exhibits poor adhesion to a polarizer. Thus, the polyester protective film may be modified with the primer layer to exhibit good adhesion to a polarizer. The primer layer may have an index of refraction of 1.0 to 1.6, specifically 1.1 to 1.6, 1.2 to 1.6, 1.3 to 1.6, 1.4 to 1.6, or 1.5 to 1.6. Within this range, the primer layer can be used in an optical film and a refractive index ratio of the primer layer to the polyester protective film can be suitably adjusted to improve transmittance of the polarizer protective film. The primer layer may have a thickness of 1 nm to 200 nm, specifically 60 nm to 200 nm. Within this range, the primer layer can be used in an optical film and have a suitable index of refraction, as compared with that of a base film, thereby increasing transmittance of the polarizer protective film without embrittlement. The primer layer may be a non-urethane-based primer layer that does not contain a urethane group. Specifically, the primer layer may be formed of a primer layer composition including resins such as a polyester resin and an acryl resin, or monomers. A mixing ratio (for example, molar ratio) of the monomers may be properly controlled to provide an index of refraction within the range described above. The primer layer composition may further include at least one additive selected from among a UV absorber, an antistatic agent, an antifoaming agent, a surfactant, and the like.

The functional layer may provide at least one selected from among glare, anti-glare, anti-reflection, low reflection, hard coating, anti-fingerprint, anti-contamination, diffusion, and refraction functions. Preferably, the functional layer includes a hard coating layer.

The polyester protective film may have a light transmittance of 80% or more, specifically 85% to 95%, in the visible region (for example, at a wavelength of 380 nm to 780 nm). Within this range, the polyester protective film can be used in a polarizing plate.

In accordance with another aspect of the present invention, a polarizing plate includes the polyester protective film according to the present invention. Particularly, the polarizing plate may be a viewer side polarizing plate of a liquid crystal display, and the polyester protective film may be disposed on a light exit surface of a polarizer. Thus, the polyester protective film can effectively block external UV light, thereby effectively preventing UV-induced damage to a liquid crystal of a liquid crystal panel.

A polarizing plate according to one embodiment of the present invention will be described with reference to FIG. 1. FIG. 1 is a sectional view of a polarizing plate according to one embodiment of the present invention.

Referring to FIG. 1, the polarizing plate 100 according to this embodiment may include a polarizer 110 and a polarizer protective film 120.

The polarizer 110 polarizes light from a liquid crystal panel and allows the polarized light to travel to the polarizer protective film 120. The polarizer 110 may include any typical polarizer known to those skilled in the art. Specifically, the polarizer may include a polyvinyl alcohol-based polarizer obtained by uniaxially stretching a polyvinyl alcohol film, or a polyene-based polarizer obtained by dehydrating a polyvinyl alcohol film. The polarizer 110 may have a thickness of 5 μm to 40 μm. Within this range, the polarizer can be used in a liquid crystal display.

The polarizer protective film 120 is formed on the polarizer 110 to protect the polarizer 110. The polarizer protective film 120 may be formed on a light exit surface of the polarizer 110. The polarizer protective film 120 may be formed on the light exit surface of the polarizer 110 to block UV light.

The polarizing plate 100 may have a thickness of 150 μm to 400 μm. Within this range, the polarizing plate can be used in an optical display.

Although not shown in FIG. 1, an adhesive layer may be formed between the polarizer 110 and the polarizer protective film 120 to attach the polarizer to the polarizer protective film. The adhesive layer may include any typical adhesive (for example, water-based or photocurable adhesives) known to those skilled in the art.

In addition, although not shown in FIG. 1, an optical film may be formed on the other surface of the polarizer 110 (e.g., a light incident surface). The optical film serves to protect the polarizer or provide optical compensation. The optical film may be a film formed of an optically transparent resin. Specifically, the optically transparent resin may include at least one of polyesters such as polyethylene terephthalate (PET), polybutylene terephthalate, polyethylene naphthalate, and polybutylene naphthalate, cellulose ester resins such as acryl, cyclic olefin polymer (COP), and triacetyl-cellulose (TAC) resins, polyvinyl acetate, polyvinyl chloride (PVC), polynorbornene, polycarbonate (PC), polyamide, polyacetal, polyphenylene ether, polyphenylene sulfide, polysulfone, polyether sulfone, polyacrylate, and polyimide resins. The optical film may include a film formed of the optically transparent resin subjected to modification. Here, modification may include copolymerization, branching, crosslinking, modification of molecular terminals, and the like.

The liquid crystal panel transmits light from a high-color gamut light source to the polarizing plate. The liquid crystal panel may include a first substrate, a second substrate, and a liquid crystal layer secured between the first substrate and the second substrate. The liquid crystal panel may employ a vertical alignment (VA) mode, a patterned vertical alignment (PVA) mode, or a super-patterned vertical alignment (S-PVA) mode, without being limited thereto.

The liquid crystal display may further include a polarizing plate on a surface of the liquid crystal panel opposite the viewer side surface, i.e., between the liquid crystal panel and the high-color gamut light source. The polarizing plate may include any typical polarizing plate known to those skilled in the art.

The liquid crystal display may further include a light guide plate, a reflective plate, an optical sheet and the like, which are typically included in a liquid crystal display. Details of the light guide plate, the reflective plate, and the optical sheet are the same as those well known to those skilled in the art.

Next, the present invention will be described in more detail with reference to some examples. However, it should be noted that these examples are provided for illustration only and are not to be construed in any way as limiting the present invention.

Example 1

A mixture for preparing a polyethylene terephthalate film including 2.5 wt % of a UV absorber (Tinuvin 360, BASF SE), 0.5 wt % of a UV absorber (Tinuvin 234, BASF SE), and 0.5 wt % of an antioxidant (Irgafos 168) was subjected to melt extrusion, and then the extruded product was stretched to 3.4 times and 3.8 times initial lengths thereof in the MD and the TD, respectively, thereby preparing a 40 μm thick polyethylene terephthalate film (Re at a wavelength of 550 nm: 237 nm, Rth: 6,948 nm, NZ: 30). Here, Tinuvin 360 (BASF SE) was the UV absorber represented by Formula 1 and Tinuvin 234 (BASF SE) was the UV absorber represented by Formula 2.

A polyvinyl alcohol film (thickness: 60 μm, polymerization degree: 2,400, saponification degree: 99.0%, VF-PS6000, Kuraray Co., Ltd., Japan) was subjected to swelling in an aqueous solution at 25° C., followed by dyeing and stretching in an iodine ion-containing dyeing bath at 30° C. Then, the dyed polyvinyl alcohol film was finally further stretched to 6 times the original length thereof in a boric acid solution at 55° C. The obtained polyvinyl alcohol film was dried in a chamber at 50° C. for 3 minutes, thereby preparing a polarizer (thickness: 12 μm).

The prepared polarizer protective film was attached to a light exit surface of the prepared polarizer through an adhesive layer, and then a triacetylcellulose film (Zero TAC) was attached to the other surface of the polarizer, i.e., a light incident surface, thereby preparing a polarizing plate. Here, the adhesive layer had a thickness of 2 μm and was formed of a UV-curable adhesive.

Examples 2 to 4

A polyethylene terephthalate film and a polarizing plate were prepared in the same manner as in Example 1 except that the amounts of the UV absorber (Tinuvin 360, BASF SE), and the UV absorber (Tinuvin 234) were changed as listed in Table 1.

Comparative Example 1

A polyethylene terephthalate film and a polarizing plate were prepared in the same manner as in Example 1 except that the UV absorber (Tinuvin 360) and the UV absorber (Tinuvin 234) were not used.

Comparative Example 2

A polyethylene terephthalate film and a polarizing plate were prepared in the same manner as in Example 1 except that a UV absorber (Tinuvin 329, benzotriazole UV absorber, BASF SE), and a UV absorber (Tinuvin 312, oxanilide UV absorber, BASF SE), were used in amounts listed in Table 1 instead of the UV absorber (Tinuvin 360) and the UV absorber (Tinuvin 234).

Comparative Example 3

A polyethylene terephthalate film and a polarizing plate were prepared in the same manner as in Example 1 except that a UV absorber (Tinuvin 329, benzotriazole UV absorber, BASF SE) and a UV absorber (Tinuvin 312, oxanilide UV absorber, BASF SE), were used in amounts listed in Table 1 instead of the UV absorber (Tinuvin 360) and the UV absorber (Tinuvin 234).

Comparative Example 4

A polyethylene terephthalate film and a polarizing plate were prepared in the same manner as in Example 1 except that a UV absorber (Tinuvin 329, benzotriazole UV absorber, BASF SE) was used in an amount as listed in Table 1 instead of the UV absorber (Tinuvin 360).

Comparative Example 5

A polyethylene terephthalate film and a polarizing plate were prepared in the same manner as in Example 1 except that the UV absorber (Tinuvin 234) was not used.

Comparative Example 6

A polyethylene terephthalate film and a polarizing plate were prepared in the same manner as in Example 1 except that the UV absorber (Tinuvin 360) was not used.

Each of the polyethylene terephthalate films prepared in Examples and Comparative Examples was evaluated as to the following properties:

(1) Light transmittance: Light transmittance of each of the polyethylene terephthalate films prepared in Examples and Comparative Examples was measured using a light transmittance meter, a UV-2450 (UV-VIS) spectrometer (Shimadzu Corporation).

(2) YI: Yellow index of each of the polyethylene terephthalate films prepared in Examples and Comparative Examples was measured under illuminant D65 at an angle of 2 degrees (defined between the polyethylene terephthalate film and the light source) using a yellow index meter (Konica Minolta CM-3600d colorimeter). Here, measurement of the yellow index was performed in accordance with ASTM D1925.

(3) ΔYI: YI of each of the polyethylene terephthalate films prepared in Examples and Comparative Examples was measured in the same manner as in (2). Then, each of the polyethylene terephthalate films was left at 63° C. and 40% RH for 500 hours in an Xe-lamp chamber simulating sunlight (Model Q-SUN Xe-1, Q-LAB Corporation, light fluence at a wavelength of 340 nm: 0.68 W/m$^2$), followed by measurement of YI in the same manner as in (2). Then, ΔYI was calculated according to Equation 4.

TABLE 1

| | Film thickness (μm) | First UV absorber Kind | Amount (wt %) | Second UV absorber Kind | Amount (wt %) | Light transmittance (%, @370 nm) | Light transmittance (%, @380-382 nm) | YI | ΔYI |
|---|---|---|---|---|---|---|---|---|---|
| Example 1 | 40 | Tinuvin 360 | 2.5 | Tinuvin 234 | 0.5 | 0.5 | 3.59 | 0.08 | 0.52 |
| Example 2 | 40 | Tinuvin 360 | 3.0 | Tinuvin 234 | 0.5 | 0.5 | 3.24 | 0.36 | 0.67 |
| Example 3 | 40 | Tinuvin 360 | 2.5 | Tinuvin 234 | 1.0 | 0.4 | 3.89 | 0.75 | 0.48 |
| Example 4 | 40 | Tinuvin 360 | 3.0 | Tinuvin 234 | 1.0 | 0.3 | 3.37 | 0.96 | 0.34 |
| Comp. Example 1 | 40 | — | — | — | — | 84.1 | 88.3 | 1.9 | 6.87 |
| Comp. Example 2 | 40 | Tinuvin 329 | 2.5 | Tinuvin 312 | 0.5 | 0.4 | 7.32 | 2.03 | 0.53 |
| Comp. Example 3 | 40 | Tinuvin 329 | 4.5 | Tinuvin 312 | 0.5 | 0.2 | 6.48 | 2.84 | 0.37 |
| Comp. Example 4 | 40 | Tinuvin 329 | 2.5 | Tinuvin 234 | 0.5 | 0.2 | 3.26 | 1.28 | 0.84 |
| Comp. Example 5 | 40 | Tinuvin 360 | 2.5 | — | — | 3.5 | 3.98 | 0.54 | 0.78 |
| Comp. Example 6 | 40 | — | — | Tinuvin 234 | 0.5 | 0.6 | 7.48 | 0.62 | 1.34 |

As shown in Table 1, it can be seen that the polyester protective films for polarizing plates according to the present invention had much lower yellow indexes and lower UV transmittance than the polyester protective films of Comparative Examples. Particularly, the polyester protective films according to the present invention had a much lower yellow index than the polyester protective film of Comparative Example 4 using a different benzotriazole UV absorber. In addition, the polyester protective films according to the present invention exhibited low variation in yellow index even after being left under predetermined conditions.

Conversely, the polyester protective films of Comparative Example 5 and Comparative Example 6, including only one of the UV absorber represented by Formula 1 and the UV absorber represented by Formula 2, had an excessively high UV transmittance in a specific wavelength band and exhibited severe yellowing.

It should be understood that various modifications, changes, alterations, and equivalent embodiments can be made by those skilled in the art without departing from the spirit and scope of the invention.

The invention claimed is:

1. A polyester protective film for polarizing plates having a yellow index (YI) of 1.0 or less, wherein the polyester protective film includes a UV absorber represented by Formula 1 and a UV absorber represented by Formula 2:

<Formula 1>

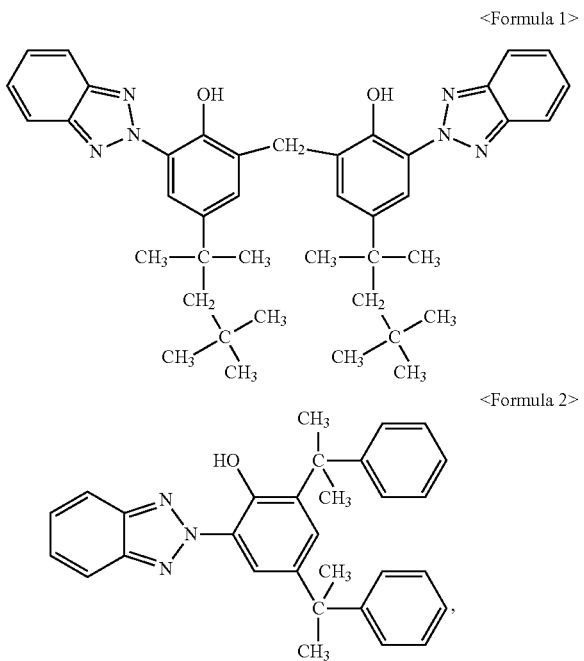

<Formula 2> wherein the polyester protective film has an out-of-plane retardation of 2,500 nm to 12,000 nm as measured at a wavelength of 550 nm and represented by Equation 3:

$$Rth = ((nx+ny)/2 - nz) \times d \qquad \text{<Equation 3>}$$

wherein in Equation 3, Rth is the out-of-plane retardation, nx, ny and nz are indices of refraction in the slow axis, fast axis, and thickness directions of the polyester protective film at the wavelength of 550 nm respectively, and d is a thickness of the polyester protective film with a unit of nm, and wherein the polyester protective film has a change in yellow index ($\Delta$YI) of 0.7 or less, as calculated according to Equation 4:

$$\text{Change in yellow index} = YI_2 - YI_1 \qquad \text{<Equation 4>}$$

wherein $YI_1$ denotes an initial yellow index of the polyester protective film and $YI_2$ denotes a yellow index measured after irradiation with light at a fluence of 0.68 W/m2 at a wavelength of 340 nm at 63° C. and 40% RH for 500 hours.

2. The polyester protective film according to claim 1, wherein the polyester protective film has a transmittance of 1% or less, as measured at a wavelength of 370 nm.

3. The polyester protective film according to claim 1, wherein the polyester protective film has a transmittance of 5% or less, as measured at a wavelength within a range of 380 nm to 382 nm.

4. The polyester protective film according to claim 1, wherein the UV absorber represented by Formula 1 is present in an amount of 0.5 wt % to 5.0 wt % in the polyester protective film and the UV absorber represented by Formula 2 is present in an amount of 0.1 wt % to 2.0 wt % in the polyester protective film.

5. The polyester protective film according to claim 1, wherein the polyester protective film has an in-plane retardation of about 350 nm or less, as measured at a wavelength of 550 nm and represented by Equation 1:

$$Re = (nx-ny) \times d \qquad \text{<Equation 1>}$$

wherein Re is the in-plane retardation, nx and ny are indices of refraction in slow axis and fast axis directions of the polyester protective film at the wavelength of 550 nm, respectively, and d is a thickness of the polyester protective film with a unit of nm.

6. The polyester protective film according to claim 1, wherein the polyester protective film includes at least one of polyethylene terephthalate, polyethylene naphthalate, polybutylene terephthalate, and polybutylene naphthalate.

7. The polyester protective film according to claim 1, further including: at least one additive of an oxidation stabilizer, a dispersant, an antifoaming agent, a lubricant, a radical scavenger, an acid scavenger, a leveling agent, a surface energy modifier, a preservative, and an antioxidant.

8. A polarizing plate comprising:
a polarizer; and
a polyester protective film formed on at least one surface of the polarizer,
wherein the polyester protective film is the polyester protective film for polarizing plates according to claim 1.

9. A liquid crystal display comprising the polarizing plate according to claim 8.

* * * * *